United States Patent [19]

White

[11] Patent Number: 4,726,607
[45] Date of Patent: Feb. 23, 1988

[54] CLIPBOARD FOR AN AUTOMOBILE STEERING WHEEL

[76] Inventor: Richard E. White, 36 Wisconsin Ave., Waukegan, Ill. 60085

[21] Appl. No.: 923,284

[22] Filed: Oct. 27, 1986

[51] Int. Cl.$^4$ .................. B42D 17/00; G09F 19/00; A47F 5/00; F16B 45/00

[52] U.S. Cl. ........................................ 281/45; 40/308; 211/86; 248/304

[58] Field of Search ............... 281/45; 248/205.2, 304, 248/316.31; 211/50, 52, 86; 40/308; D19/88; 206/806

[56] References Cited

U.S. PATENT DOCUMENTS

| | | | |
|---|---|---|---|
| 2,658,773 | 11/1953 | Tarris | 281/45 |
| 2,891,752 | 6/1959 | Genter | 248/304 |
| 3,411,633 | 11/1968 | Magnuson | 248/304 |
| 4,156,318 | 5/1979 | Economy | 40/308 |
| 4,243,249 | 1/1981 | Goss | 281/45 |
| 4,445,728 | 5/1984 | Bratton | 281/45 |
| 4,496,058 | 1/1985 | Harris et al. | 211/86 |

Primary Examiner—E. R. Kazenske
Assistant Examiner—Paul M. Heyrana, Sr.
Attorney, Agent, or Firm—Gilden & Israel

[57] ABSTRACT

A clipboard is provided with a flexible hook which allows it to be selectively positioned over a curved vehicle steering wheel. A bottom portion of the clipboard is provided with a Velcro attachment strap to securely attach the clipboard to the steering wheel. The clipboard may then be used to hold books, writing material, or the like.

1 Claim, 4 Drawing Figures

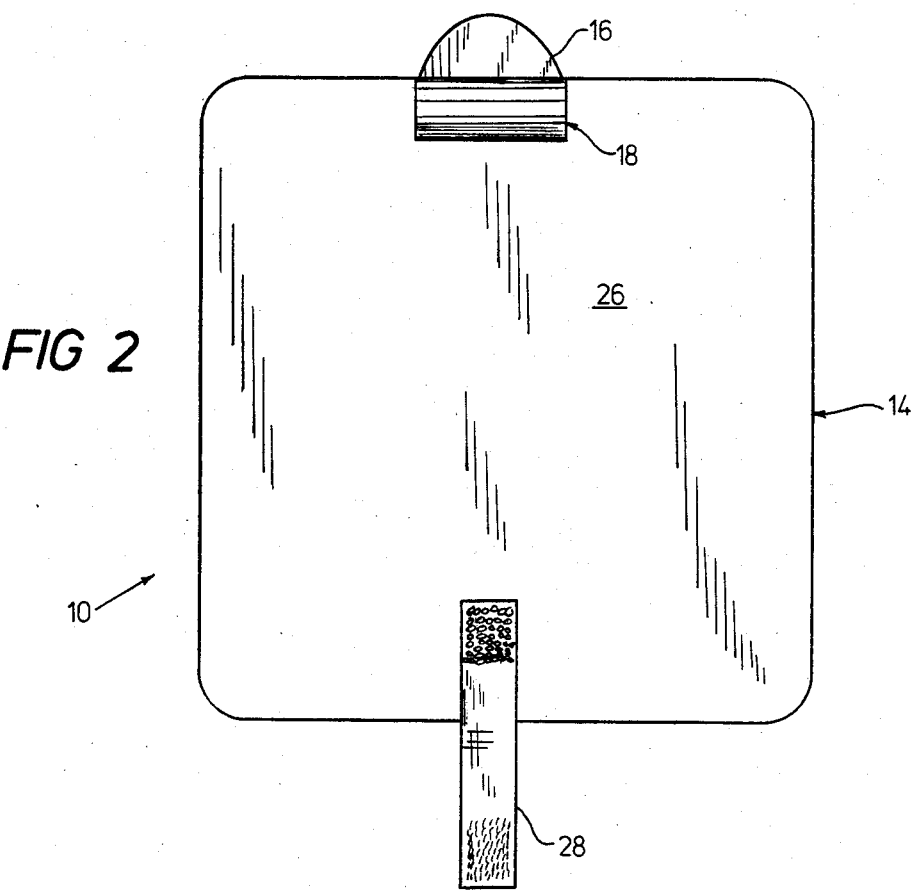
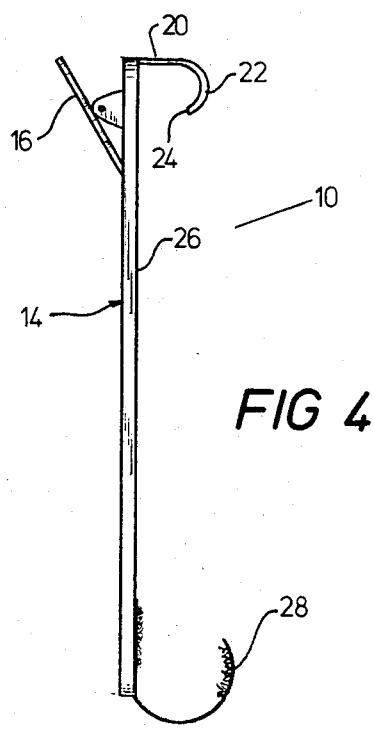

CLIPBOARD FOR AN AUTOMOBILE STEERING WHEEL

BACKGROUND OF THE INVENTION

1. Field of the Invention

The present invention relates to clipboards, and more particularly pertains to a new and improved clipboard which may be selectively and securely fastened to a vehicle's steering wheel.

2. Description of the Prior Art

Clipboards and similar copy holding devices utilizing attachment means for facilitating their secure engagement with a static structure are well known in the prior art. For example, U.S. Pat. No. Des. 273,002, which issued to E. Schafer on Mar. 13, 1984, discloses a note clipboard attachable to an automobile visor. In this respect, spring clips are integrally provided on opposed sides of the clipboard, with such clips being attachable to a static structure and the opposed clips then being utilized to retain paper materials in secure engagement with the clipboard.

Similarly, U.S. Pat. No. 4,496,058, which issued to Harris et al on Jan. 29, 1985, discloses a shopping organizer which is effectively a clipboard provided with spring clips on opposed sides thereof. Clips on one side of the organizer are spring-biasedly engagable with the arms of a shopping cart, while the opposed side clips may then be utilized to hold coupons or other paper materials in secure engagement with the board.

As can be appreciated, both of the above-described clipboards require special manufacturing processes too effect the attachment of the integral spring clips thereto. In this respect, the design of these clipboards is such as to be a substantial variation from a conventional clipboard and accordingly, both of these clipboards apparently met with little or no commercial success. Further, neither of these clipboards are particularly well adapted for use in a vehicle, such as being attachable to a vehicle steering wheel, and it would therefore appear that there is a continuing need for new and improved clipboards which could be inexpensively and easily manufactured. More particularly, such an inexpensive manufacturing process should ideally include the use of a conventional clipboard, while it would also be desirable to have such a clipboard utilizable in a convenient manner within an automobile or the like. Ideally, such a clipboard would be attachable to a steering wheel to facilitate its use by a vehicle user, and in this respect, the present invention substantially fulfills this need.

SUMMARY OF THE INVENTION

In view of the foregoing disadvantages inherent in the known types of clipboards now present in the prior art, the present invention provides an improved clipboard construction wherein the same can be securely attached to a vehicle steering wheel. As such, the general purpose of the present invention, which will be described subsequently in greater detail, is to provide a new and improved clipboard which has all the advantages of the prior art clipboards and none of the disadvantages.

To attain this, the present invention makes use of a conventional clipboard design and further includes an arched clip along a topmost portion thereof. The arched clip is positionable over the top of a vehicle steering wheel so as to permit the clipboard to swing downwardly into a planar engagement with the wheel, and a Velcro strap attached to a bottommost portion of the clipboard may then be extended around the bottom portion of the steering wheel to effect a secure attachment of the clipboard thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this diclosure is based, may readily be utiized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved clipboard which has all the advantages of the prior art clipboards and none of the disadvantages.

It is another object of the present invention to provide a new and improved clipboard which may be easily and efficiently manufactured and marketed.

It is a further object of the present invention to provide a new and improved clipboard which is of a durable and reliable construction.

An even further object of the present invention is to provide a new and improved clipboard which is susceptible of a low cost of manufacture with regard to both materials and labor, and which accordingly is then susceptible of low prices of sale to the consuming public, thereby making such clipboards economically available to the buying public.

Still yet another object of the present invention is to provide a new and improved clipboard which provides in the apparatuses and methods of the prior art some of the advantages thereof, while simultaneously overcoming some of the disadvantages normally associated therewith.

Still another object of the present invention is to provide a new and improved clipboard which may be securely attached to a vehicle steering wheel.

Yet another object of the present invention is to provide a new and improved clipboard construction which permits a conventional clipboard to be adapted for use in a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a bottom plan view of the invention.

FIG. 4 is a side elevation view of the invention.

DESCRIPTION OF THE PREFERRED EMBODIMENT

Figure 1:
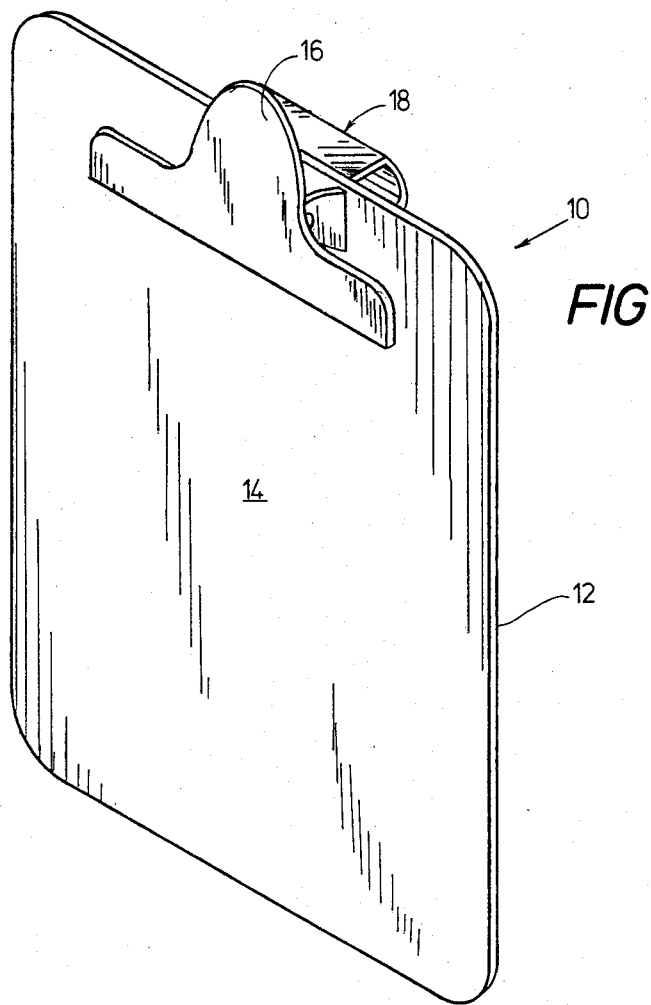
FIG. 1 is a perspective view of the clipboard for a vehicle comprising the present invention.
Figure 3:
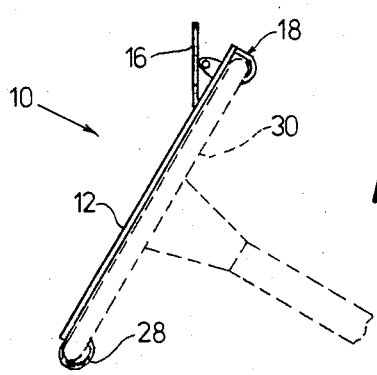
FIG. 3 is a representation of the invention attached to a vehicle steering wheel.

With reference now to the drawings, and in particular to FIGS. 1, 2, 3 and 4 thereof, a new and improved clipboard embodying the principles and concepts of the present invention and generally designated by the reference numeral 10 will be described.

More specifically, it will be noted that the clipboard 10 comprising the invention conists of a conventional clipboard 12 that includes a rigid planar writing surface 14 and a manually operable paper holding clip 16 fixedly secured thereto. In this regard, the conventional clipboard 12 comprising a part of the combination of the present invention is representative of all known types and designs of clipboards which would function in the desired manner. As such, it is within the intent and purview of the present invention to include all such functional designs of clipboards.

As further illustrated in the drawings, the clipboard 12 includes a rigid wheel engaging member 18 fixedly secured along a top rear portion of the board. The wheel engaging member 18 could be formed of any rigid material, such as plastic, metal, or the like, and includes an extended flat portion 20 with an integral or otherwise separately attached curved portion 22 being connected thereto. The extended flat portion 20 facilitates the formation of a gap, i.e., a spaced-apart relationship, between a free end 24 of the clip 18 and a rear surface 26 of the board 14. The gap between the end 24 and the board rear surface 26 facilitates a positioning of the clip 18 over a steering wheel in a now apparent manner.

With further reference to the drawings, it will be seen that a hook and loop fastening means 28 may be securely attached to a bottom rear portion of the board 14. In this respect, the hook and loop fastening means 28 would most likely consist of a conventional Velcro strap. The Velcro strap 28 is flexibly movable around a bottom portion of a steering wheel 30 once the clip 18 has been positioned over a top portion of the wheel, thereby to effect a secure attachment of the clipboard 10 to the wheel. Of course, it is within the intent and purview of the invention to include the use of any flexible attachment means which would effect the securing of the clipboard 10 to a vehicle steering wheel 30. Accordingly, all such flexible attachment means are within the scope of the claims appended hereto.

With respect to the manner of usage and operation of the present invention, the same should be apparent from the above description. However, a brief summary thereof will be provided. More specifically, it can be appreciated that the clipboard 10 may be desirably positioned over and secured to a steering wheel 30 through a use of the holding clip 18 and the Velcro attachment means 28. The device 10 is particularly useful for people who eat in their cars inasmuch as this permits them to attach reading material to the clipboard while leaving their hands free to consume their food. Of course, the clipboard can also be utilized as a writing surface or for any other conceivable function which would prove to be convenient to a user.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A clipboard selectively attachable to a vehicle's steering wheel, said clipboard comprising:
   a. clipboard means;
   b. first attachment means fixedly secured to said clipboard means and being engageable with said vehicle steering wheel, said first attachment means comprising a hook means fixedly secured to a topmost portion of said clipboard means, said hook means being formed from a rigid material, said hook means further comprising a planar extended portion and a curvilinear portion integrally attached to said planar extended portion, said curvilinear portion having a free end, said free end being spaced apart from said clipboard means, thereby to define a gap through which a topmost portion of said vehicle steering wheel may be inserted; and,
   c. second attachment means fixedly secured to said clipboard means and being engageable with said vehicle steering wheel, said second attachment means comprising a flexible hook and loop, said hook and loop further comprising a Velcro fastener, said Velcro fastener being fixedly securable to a bottommost portion of said vehicle steering wheel, thereby to effect a secure engagement of said clipboard means to said vehicle steering wheel.

* * * * *